(12) United States Patent
Kleinberg et al.

(10) Patent No.: US 6,585,804 B2
(45) Date of Patent: Jul. 1, 2003

(54) PRESSURE SWING ADSORPTION PROCESS OPERATION AT TURNDOWN CONDITIONS

(75) Inventors: William Thomas Kleinberg, Emmaus, PA (US); Mark Robert Pillarella, Center Valley, PA (US); David Edward Guro, Coopersburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/007,221

(22) Filed: Nov. 9, 2001

(65) Prior Publication Data

US 2003/0097930 A1 May 29, 2003

(51) Int. Cl.$^7$ .............................................. B01D 53/047
(52) U.S. Cl. ............................. 95/101; 95/102; 95/105; 95/130
(58) Field of Search .............................. 95/96–105, 130, 95/902

(56) References Cited

U.S. PATENT DOCUMENTS

| | | | |
|---|---|---|---|
| 4,140,495 A | 2/1979 | Pietruszewski | 55/21 |
| 4,323,370 A | 4/1982 | Leitgeb | 55/18 |
| 4,494,966 A | 1/1985 | Umeki | 55/26 |
| 4,561,865 A | 12/1985 | McCombs et al. | 55/25 |
| 4,576,614 A | 3/1986 | Armond et al. | 55/18 |
| 4,643,743 A | 2/1987 | Grader | 55/26 |
| 4,693,730 A | 9/1987 | Miller et al. | 55/18 |
| 5,042,994 A | 8/1991 | Smolarek | 55/18 |
| 5,108,467 A | 4/1992 | Schroter et al. | 55/25 |
| 5,258,056 A | 11/1993 | Shirley et al. | 95/22 |
| 5,370,728 A * | 12/1994 | LaSala et al. | 95/101 |
| 5,536,299 A * | 7/1996 | Girard et al. | 95/101 |
| 5,565,018 A * | 10/1996 | Baksh et al. | 95/100 |
| 5,658,371 A * | 8/1997 | Smolarek et al. | 95/101 |
| 5,702,504 A * | 12/1997 | Schaub et al. | 95/101 |
| 5,733,359 A | 3/1998 | Doong et al. | 95/8 |
| 5,755,856 A * | 5/1998 | Miyake et al. | 95/101 |
| 5,792,239 A * | 8/1998 | Reinhold, III et al. | 95/101 |
| 5,871,564 A * | 2/1999 | McCombs | 95/98 |
| 5,906,674 A * | 5/1999 | Tan et al. | 95/98 |
| 6,045,603 A * | 4/2000 | Chen et al. | 95/101 |
| 6,156,101 A * | 12/2000 | Naheiri | 95/101 |
| 6,428,607 B1 * | 8/2002 | Xu et al. | 95/101 |

* cited by examiner

Primary Examiner—Robert H. Spitzer
(74) Attorney, Agent, or Firm—John M. Fernbacher

(57) ABSTRACT

A method for operating a pressure swing adsorption process at turndown conditions by adding selected steps to the normal design operation of the process. The selected steps include the extension of a make product/no feed step and the addition of idle steps at specific points in the process cycle during depressurization and repressurization. The average volumetric flow ratio of the pressurized feed gas to the final product gas during design operation and during turndown operation may be essentially equal. The average oxygen concentration in the final product gas during design operation and during turndown operation also may be essentially equal.

24 Claims, 12 Drawing Sheets

FIG. 1

| | | | | | | | | |
|---|---|---|---|---|---|---|---|---|
| Bed A | Make Product | | Make Product / No Feed | | Prov Purge | PPE/ Evac | Evac | |
| Bed B | Rec Purge | PE / Atm Atm Rep | Atm / Feed Repress | | Make Product | | Make Product / No Feed | Atm / Feed Repress |
| Bed C | Prov Purge | PPE/ Evac | Evac | | Rec Purge | PE / Atm Atm Rep | Make Product | PPE/ Evac |
| Step No. | 2 | 3 | 4A | 4B | 5 | 6 | 7A | 7B |

| | | |
|---|---|---|
| Rec Purge | PE / Atm Rep | Atm / Feed Repress |
| Prov Purge | PPE/ Evac | Evac |
| Make Product | | Make Product / No Feed |
| 8 | 9 | 1A | 1B |

FIG. 5

| time | 0 | | | | a |
|---|---|---|---|---|---|
| Bed A | Make Product | Make Product / No Feed | | | |
| Bed B | Rec Purge | PE/ Atm | Idle | Atm Repress | Feed Repress |
| Bed C | Prov Purge | PPE/ Evac | Idle | Evac | |
| Step No. | 2 | 3A | 3B | 4A | 4B |

| time | a | | | | b |
|---|---|---|---|---|---|
| Bed A | Prov Purge | PPE/ Evac | Idle | Evac | |
| Bed B | Make Product | Make Product / No Feed | | | |
| Bed C | Rec Purge | PE/ Atm | Idle | Atm Repress | Feed Repress |
| Step No. | 5 | 6A | 6B | 7A | 7B |

| time | b | | | | c |
|---|---|---|---|---|---|
| Bed A | Rec Purge | PE/ Atm | Idle | Atm Repress | Feed Repress |
| Bed B | Prov Purge | PPE/ Evac | Idle | Evac | |
| Bed C | Make Product | Make Product / No Feed | | | |
| Step No. | 8 | 9A | 9B | 1A | 1B |

FIG. 9

| time | 0 | | | | | a |
|---|---|---|---|---|---|---|
| Bed A | Make Product | Make Product / No Feed | | | | |
| Bed B | Rec Purge | PE / ATM / EVAC | Feed / Amb Air to Vac Blower | | Atm Repress | Feed Repress |
| Bed C | Prov Purge | PPE | Idle | | | Evac |
| Step No. | 2 | 3A | 3B | 3C | 4A | 4B |

| time | a | | | | | b |
|---|---|---|---|---|---|---|
| Bed A | Prov Purge | PPE | Idle | | | Evac |
| Bed B | Make Product | Make Product / No Feed | | | | |
| Bed C | Rec Purge | PE / ATM / EVAC | Feed / Amb Air to Vac Blower | | Atm Repress | Feed Repress |
| Step No. | 5 | 6A | 6B | 6C | 7A | 7B |

| time | b | | | | | c |
|---|---|---|---|---|---|---|
| Bed A | Rec Purge | PE / ATM / EVAC | Feed / Amb Air to Vac Blower | | Atm Repress | Feed Repress |
| Bed B | Prov Purge | PPE | Idle | | | Evac |
| Bed C | Make Product | Make Product / No Feed | | | | |
| Step No. | 8 | 9A | 9B | 9C | 1A | 1B |

PRESSURE SWING ADSORPTION PROCESS OPERATION AT TURNDOWN CONDITIONS

BACKGROUND OF THE INVENTION

Pressure swing adsorption is a well-known method for the separation of bulk gas mixtures and for the purification of gas streams containing low concentrations of undesirable components. The method has been developed and adapted for a wide range of feed gases, operating conditions, product purity, and product recovery. Many pressure swing adsorption systems utilize two or more adsorber beds operated in a cyclic sequence in order to maintain a constant product flow rate while selected beds undergo sequential steps including adsorption, depressurization, evacuation, purge, pressure equalization, repressurization, and other related steps. Multiple adsorber beds using numerous process steps are required to achieve high purity and/or recovery of valuable gaseous products such as hydrogen, carbon oxides, synthesis gas, light hydrocarbons, and the like. Multiple adsorber beds using these process steps also are used to recover oxygen from air.

Many of these pressure swing adsorption processes operate partially at pressures below atmospheric and are described in the art as vacuum swing adsorption (VSA) or vacuum-pressure swing adsorption (VPSA) processes. In the present specification, pressure swing adsorption (PSA) is used as a generic term to describe all types of cyclic adsorption systems regardless of operating pressure levels.

In PSA process cycles, the gas needed for the purge and repressurization steps is provided by gas obtained during other process steps. Repressurization can be accomplished by using final product gas, intermediate gas obtained by pressure equalization among beds, pressurized feed gas, or combinations thereof. Purge can be provided by intermediate depressurization gas from other beds and/or by final product gas.

PSA plants typically are designed for optimum efficiency at product flow rates and product purities specified by the product gas consumer. In the operation of most PSA plants, however, the product gas requirements of the consumer vary with time, and the PSA system often must operate at turndown conditions to provide product gas at flow rates which are less than the design flow rates. During such turndown periods, it is desirable to minimize the inefficiencies caused by off-design operation of the PSA system in order to minimize the overall cost of the product gas.

Modifications to a PSA process can be made to minimize the economic impact of turndown operation. Such modifications must be compatible with the specific PSA process cycle and should minimize the need for additional equipment for operating at turndown conditions. The invention described below and defined by the claims which follow offers a simple method for the economic operation of a PSA process cycle at such turndown conditions.

BRIEF SUMMARY OF THE INVENTION

The invention relates to a pressure swing adsorption process for the separation of a pressurized feed gas containing at least one more strongly adsorbable component and at least one less strongly adsorbable component. The method comprises operation of the process during two periods—a period of design product gas flow and a period of reduced product gas flow or turndown.

During a period of design product gas flow, the process comprises the steps of (1) introducing the pressurized feed gas into a feed end of an adsorber bed containing one or more solid adsorbents which preferentially adsorb the more strongly adsorbable component and withdrawing from a product end of the adsorber bed a first adsorber effluent gas enriched in the less strongly adsorbable component, wherein the first adsorber effluent gas is utilized as final product gas;

(2) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is withdrawn therefrom, and wherein the second adsorber effluent gas is utilized as additional final product gas;

(3) depressurizing the adsorber bed to a minimum bed pressure by withdrawing additional gas therefrom;

(4) repressurizing the adsorber bed by introducing repressurization gas into the bed, wherein at least a portion of the repressurization gas is provided by pressurized feed gas; and (5) repeating steps (1) through (4) in a cyclic manner.

During a period of reduced product gas flow, the process utilizes steps (1) through (5) in modified form wherein the duration of step (2) is extended, a first idle period is introduced into step (3), and a second idle period or a modified idle period is introduced into step (4).

The average volumetric flow ratio of the pressurized feed gas to the final product gas during (a) may be essentially equal to the average volumetric flow ratio of the pressurized feed gas to the final product gas during (b). The more strongly adsorbable component may be nitrogen and the less strongly adsorbable component may be oxygen, and the average oxygen concentration in the final product gas during (a) may be essentially equal to the average oxygen concentration in the final product gas during (b).

The adsorber bed may be one of a plurality of adsorber beds, each of which undergoes in turn steps (1) through (5) during (a) and steps (1) through (5) in modified form during (b). In this embodiment, the depressurizing of each adsorber bed in step (3) may be accomplished by (3a) withdrawing a first gas stream from the bed until the pressure therein reaches a first intermediate pressure and utilizing at least a portion of the first gas stream to purge another bed;

(3b) withdrawing a second gas stream from the bed until the pressure therein reaches a second intermediate pressure and utilizing at least a portion of the second gas stream to pressurize yet another bed; and (3c) evacuating the bed from the feed end using a vacuum blower until the pressure therein reaches the minimum bed pressure.

The first idle period may follow step (3b). The process may further comprise purging the bed following the evacuation step (3c) by introducing a purge gas into the product end of the bed while continuing to evacuate gas from the feed end of the bed. This purge gas may be provided to the bed by a first gas stream withdrawn from another bed which is in step (3a).

The process may further comprise evacuating the bed from the feed end while withdrawing the second gas stream from the product end of the bed during step (3b). The first idle period may follow step (3b).

The repressurizing of the bed in step (4) may be accomplished by (4a) introducing repressurizing gas into the adsorber bed wherein a portion of the repressurizing gas is provided by a second gas stream withdrawn from another bed which is in step (3b); and (4b) introducing repressurizing gas into the adsorber bed wherein a portion of the repressurizing gas is provided by pressurized feed gas from a feed gas compressor.

The second idle period may follow step (4a); alternatively, the modified idle period may follow step (4a). In one embodiment, the pressurized feed gas may be air, wherein the more strongly adsorbable component is nitrogen, the less strongly adsorbable component is oxygen, and the final product gas is enriched in oxygen. In this embodiment, a portion of the repressurization gas in step (4a) may be provided by allowing atmospheric air to flow into the adsorber bed when the pressure in the bed is initially below atmospheric pressure. A portion of the repressurization gas in step (4b) may be provided by allowing atmospheric air to flow into the adsorber bed when the pressure in the bed is initially below atmospheric pressure.

The vacuum blower has an inlet which may be in flow communication with atmospheric air during step (4a). In addition, the feed gas compressor may discharge to the atmosphere during step (4a).

In one specific embodiment, the invention relates to a pressure swing adsorption process for the separation of a pressurized feed gas containing at least one more strongly adsorbable component and at least one less strongly adsorbable component. The method comprises operating the process during two periods—a period of design product gas flow and a period of reduced product gas flow or turndown.

During a period of design product gas flow, the process comprises the steps of (1) introducing the pressurized feed gas into a feed end of an adsorber bed containing one or more solid adsorbents which preferentially adsorbs the more strongly adsorbable component and withdrawing from a product end of the adsorber bed a first adsorber effluent gas enriched in the less strongly adsorbable component, wherein the first adsorber effluent gas is utilized as a final product gas, wherein the adsorber bed is one of a plurality of adsorber beds;

(2) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is withdrawn therefrom, and wherein the second adsorber effluent gas is utilized as a final product gas;

(3) depressurizing the adsorber bed to a minimum bed pressure by withdrawing additional gas therefrom, wherein the depressurizing of the adsorber bed is accomplished by (3a) withdrawing a first gas stream from the bed until the pressure therein reaches a first intermediate pressure and utilizing at least a portion of the first gas stream to purge another bed;

(3b) withdrawing a second gas stream from the bed until the pressure therein reaches a second intermediate pressure and utilizing at least a portion of the second gas stream to pressurize yet another bed; and (3c) evacuating the bed from the feed end until the pressure therein reaches the minimum bed pressure;

(4) purging the bed following the evacuation of step (3c) by introducing a purge gas into the product end of the bed while continuing to evacuate gas from the feed end of the bed, wherein the purge gas is provided to the bed by a first gas stream withdrawn from another bed in step (3a);

(5) repressurizing the adsorber bed by introducing a second gas stream withdrawn from another bed which is in step (3b);

(6) further repressurizing the adsorber bed by introducing pressurized feed gas into the bed; and (7) repeating steps (1) through (6) in a cyclic manner.

During a period of reduced product gas flow, the process utilizes steps (1) through (5) in modified form wherein the duration of step (2) is extended, a first idle period is introduced into step (3), and a second idle period or a modified idle period is introduced into step (4).

The pressurized feed gas may be air, wherein the more strongly adsorbable component is nitrogen, the less strongly adsorbable component is oxygen, and the final product gas is enriched in oxygen. The process may further comprise, following step (5) and prior to step (6), allowing atmospheric air to flow into the adsorber bed when the pressure in the bed is initially below atmospheric pressure. The process may further comprise evacuating the bed from the feed end while withdrawing the second gas stream from the product end of the bed during step (3b).

The average volumetric flow ratio of the pressurized feed gas to the final product gas during (a) may be essentially equal to the average volumetric flow ratio of the pressurized feed gas to the final product gas during (b). The more strongly adsorbable component may be nitrogen and the less strongly adsorbable component may be oxygen, and the average oxygen concentration in the final product gas during (a) may be essentially equal to the average oxygen concentration in the final product gas during (b).

BRIEF DESCRIPTION OF SEVERAL VIEWS OF THE DRAWINGS

FIG. 1 is a process cycle chart for an exemplary three bed PSA process.

FIG. 5 is a cycle chart for an exemplary three bed PSA process which includes process steps for turndown operation which may be used in an embodiment of the present invention.

FIG. 9 is a cycle chart for an exemplary three bed PSA process which includes process steps for turndown operation which may be used in another embodiment of the present invention.

DETAILED DESCRIPTION OF THE INVENTION

Figure 2:
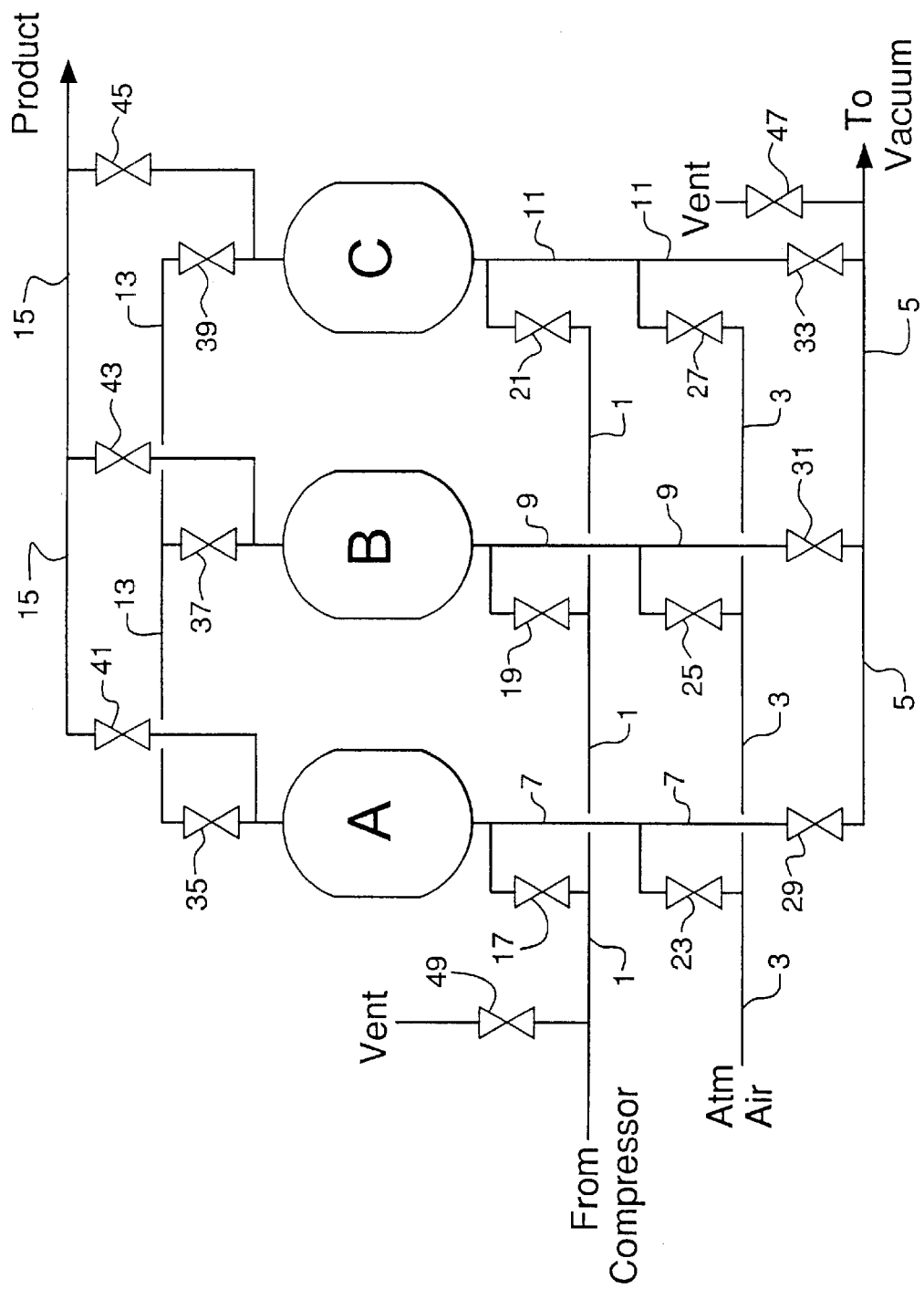
FIG. 2 is a schematic flow diagram for a three bed PSA system which may be operated according to the process cycle of FIG. 1.

The present invention relates to methods of operating a PSA process at turndown conditions by adding selected steps to the process operated at design conditions. The selected steps include an extension of a make product/no feed step and the addition of one or more idle steps at specific points in the process cycle. The process is especially useful for recovering an oxygen-enriched product from air and can utilize one adsorber or a plurality of adsorbers for carrying out the preferred process cycle.

In the present disclosure, the term final product gas means gas of sufficient product purity withdrawn from the adsorber bed(s) which is sent, with or without intermediate storage, to a final end use. None of the final product gas is returned to any of the adsorbent beds during any of the cycle steps. A feed step occurs during the time in which pressurized feed gas is introduced into the adsorber bed. A make product step is defined generically by the withdrawal of final product gas from the product end of an adsorber bed. A make product/feed step is defined as the withdrawal of final product gas from the product end of a bed while pressurized feed gas is introduced into the feed end of the bed. A make product/no feed step is defined as the withdrawal of final product gas from the product end of a bed without the introduction of pressurized feed gas into the feed end of the bed.

Depressurization is defined as the withdrawal of gas from the adsorber bed accompanied by decreasing adsorber pressure. Depressurization can be achieved by venting gas from a superatmospheric pressure directly to the atmosphere or transferring gas to another process vessel or enclosed volume which is at a lower pressure. Depressurization also can be achieved by evacuation, defined as the withdrawal of gas from the adsorber by mechanical means such as a vacuum pump or blower. Evacuation can be carried out over any range of adsorber pressures, but typically is carried out at subatmospheric pressures, i.e., under vacuum. Repressurization is defined as the introduction of gas into the adsorber vessel accompanied by increasing adsorber pressure.

Purge is defined as the introduction of a purge gas into one end of the adsorber while an effluent gas is withdrawn from the other end of the vessel. Purge can be carried out at decreasing pressure, increasing pressure, constant pressure, or any combination thereof. Purge is generally most effective at subatmospheric pressures. Void space gas is defined as nonadsorbed gas contained within the interstitial or interparticle volume within the adsorber vessel, and includes gas in the piping and vessel dead volume which is not occupied by adsorbent. Atmospheric air is uncompressed air obtained directly from the surrounding atmosphere.

The process cycle of the present invention can be carried out using a single adsorber bed or a plurality of adsorber beds. The process can be used to separate any gas mixture comprising more strongly adsorbed and less strongly adsorbed components, and is especially useful for recovering an oxygen-enriched product from air. An exemplary embodiment for the recovery of oxygen from air utilizes three adsorber beds and illustrates the invention as described below by the cycle chart of FIG. 1 and the process flow sheet of FIG. 2. The cycle illustrated in FIG. 1 is used for normal operation at the design flow rate of final product gas. Additional exemplary cycles are presented later according to the present invention in which the process is operated at turndown conditions, i.e., at final product flow rates which are below the design final product flow rates. Definitions for each cycle step in the example design cycle of FIG. 1 and for the example turndown cycles described later in FIGS. 5 and 9 are given in Table 1 below.

TABLE 1

Cycle Step Definitions for Cycles Defined in FIGS. 1, 5, and 9

| Cycle Step | Definition |
|---|---|
| Make Product/Feed | Withdraw product gas from one end of a bed while introducing pressurized feed gas into the other end. All withdrawn product gas is used as final product gas and none is returned to other beds. |
| Make Product/No Feed | Withdraw product gas at decreasing pressure from a bed without introduction of pressurized feed. All withdrawn product gas is used as final product gas and none is returned to other beds. |
| Provide Purge | Withdraw gas from a bed at decreasing pressure for use as purge gas in another bed. |
| PPE/Evac | Simultaneously evacuate a bed while providing pressure equalization gas to another bed. |
| Evacuation | Withdraw gas from a bed until pressure reaches a minimum pressure. |
| Rec Purge | Evacuate a bed from one end while introducing purge gas from another bed into the other end. |
| PE/Atm | Pressurize a bed by introducing gas from another bed into one end of the bed while drawing atmospheric air into the other end. |
| Atm Rep | Pressurize a bed by drawing atmospheric air into the bed. |
| Atm/Feed Repress | Pressurize a bed by drawing atmospheric air into one end of the bed for a portion of the cycle step while introducing pressurized feed into the other end during the entire cycle step. |
| Idle | Isolate a bed by closing inlet and outlet valves so that no gas is introduced into the bed or withdrawn from the bed. Discharge the feed compressor to the atmosphere and connect the vacuum blower suction to a dedicated atmospheric vent. |
| Modified idle | Partially isolate a bed by closing the valves at the product end of the bed while opening valves to interconnect the feed end of the bed, the feed compressor discharge, the vacuum blower suction, the atmospheric air intake/discharge line, and the feed compressor discharge vent. |

The process system of FIG. 2 may comprise three adsorber beds A, B, and C containing one or more adsorbents which preferentially adsorb at least one component in the feed gas. The beds are connected by the appropriate manifolds and valves such that the beds can proceed through the cycle steps described below. These include feed gas manifold 1; feed gas valves 17, 19, and 21; atmospheric air manifold 3; atmospheric air valves 23, 25, and 27; vacuum manifold 5; vacuum valves 29, 31, and 33; equalization manifold 13; adsorber feed end manifolds 7, 9, and 11; equalization valves 35, 37, and 39; product manifold 15; and product valves 41, 43, and 45. A feed gas compressor or blower (not shown) provides pressurized feed gas to feed gas manifold 1. A vacuum blower (not shown) evacuates gas via vacuum manifold 5. Optional valve 47 when open connects vacuum manifold 5 to the atmosphere. Valve 49 vents feed gas manifold 1 to the atmosphere and a parallel flow control valve (not shown) may be used to control the pressure at the end of the make product step described below.

A feed gas mixture, for example air, which has been filtered to remove particulate matter (not shown), is pressurized to 1.1 to 2.5 bara in a blower or compressor to provide pressurized feed gas in manifold 1 at a temperature slightly above ambient temperature. The pressurized feed gas may be separated into oxygen-rich final product via manifold 15 typically having an average oxygen concentration of at least 80 vol % and a waste gas via manifold 5 according to the exemplary cycle steps described below (refer to FIGS. 1 through 4).

1A. Atmospheric Repressurization

Atmospheric air repressurizes bed A via manifold 3, valve 23, and manifold 7 until the pressure therein approaches atmospheric pressure. The duration of this step typically may be in the range of 1.0 to 10 seconds. During this step, bed B proceeds through an evacuation step and bed C proceeds through a make product/no feed step. Beds A, B, and C contain at least one adsorbent material which preferentially adsorbs the more adsorbable component, which in this illustration is nitrogen. Typical adsorbents known in the art for this purpose include zeolites which are ion exchanged with one or more cations selected from sodium, lithium, calcium, and other cations. Two or more adsorbents can be used if desired.

1B. Atmospheric/Feed Repressurization

Pressurized feed air is introduced via manifold 1, open valve 17 and manifold 7 into bed A, while atmospheric air optionally continues to flow into bed A via open valve 23 and manifold 7, thereby increasing the pressure in bed A. This continues until the pressure therein is at or near atmospheric pressure, at which time valve 23 closes and repressurization continues by the introduction of pressurized feed gas via manifold 1, open valve 17 and manifold 7. When the pressure at the top or product end of bed A approaches the pressure in line manifold 15, valve 41 is opened, the atmospheric/feed repressurization step ends, and the make product step begins the cycle again. The duration of the atmospheric/feed repressurization step is typically in the range of 4.0 to 20 seconds. During this step, bed B continues through an evacuation step and bed C continues through a make product/no feed step.

2, 3. Make Product/Feed

Pressurized feed gas passes through manifold 1, open valve 17, and manifold 7 into adsorber bed A. Oxygen-enriched gas is withdrawn from bed A and flows through open valve 41 and into product manifold 15 to provide a final product gas enriched in the less strongly adsorbed component, which in this illustration is oxygen. During this step, defined as a make product/feed step, valves 23, 29 and 35 remain closed and the pressure in bed A increases to a maximum pressure typically in the range of 1.1 to 2.5 bara. The duration of this step can be up to about 20 seconds.

While bed A is undergoing the make product/feed step, bed B is purged and partially repressurized by gas supplied by depressurization of bed C.

4A, 4B. Make Product/no Feed

The pressurized feed gas flow to bed A is terminated by closing valve 17. Product gas continues to be withdrawn from bed A and flows through open valve 41 and product manifold 15 to provide final product gas. This is defined as a make product/no feed step. The pressure in bed A and of the product gas withdrawn therefrom decreases by about 0.015 to 0.5 bar during this step. The composition of the product gas withdrawn from bed A changes during this step but remains in the required purity range for the final gas product. The duration of this step is typically in the range of 5.0 to 20 seconds. While bed A is undergoing the make product/no feed step, Bed B undergoes repressurization and bed C undergoes evacuation.

5. Provide Purge

Valve 41 is closed, valve 35 is opened, and bed A is depressurized through manifold 13 and open valve 39 into bed C, which undergoes a purge step during which gas is withdrawn via manifold 11, open valve 33, and manifold 5 to a vacuum blower (not shown). Valves 21, 27, 45, and 47 remain closed during this step. During the provide purge step, the pressure in bed A decreases by about 0.1 to 0.5 bar. The duration of this step is typically in the range of 1.0 to 10 seconds. During this step and the following step, bed B proceeds through a make product/feed step.

6. Provide Pressure Equalization/Evacuation

Evacuation of bed C ends and evacuation of bed A begins by closing valve 33 and opening valve 29. Additional gas flows from bed A into bed C via valve 35, manifold 13, and valve 39 until the pressures are equalized or nearly equalized in the two beds. The duration of this step is typically in the range of 1.0 to 10 seconds. During this step and the preceding step, bed B proceeds through a make product/feed step. When the pressures are equalized or nearly equalized in the two beds, valves 35 and 39 are closed, bed A proceeds to the evacuation step, and bed C begins an atmospheric repressurization step.

7A, 7B. Evacuation

Gas is evacuated from bed A via manifold 7, valve 29, and manifold 5 by the vacuum blower (not shown) until the pressure in the bed reaches a minimum pressure typically in the range of 0.2 to 0.8 bara. The duration of this step is typically in the range of 5.0 to 20 seconds. During this step, bed B proceeds through a make product/no feed step and bed C undergoes repressurization.

8. Receive Purge

Evacuation of bed A continues while the bed is purged with depressurization gas supplied from bed B which proceeds through a provide purge step. This purge desorbs residual adsorbed nitrogen and prepares bed A for repressurization. Valves 35 and 37 are opened and valves 19, 25, 31, and 43 are closed during this step, the duration of which is typically in the range of 1.0 to 10 seconds. During this step and the following step, bed C proceeds through a make product/feed step.

9. Pressure Equalization/Atmospheric Repressurization

Evacuation of bed A is terminated by closing valve 29 and equalization gas continues to flow into bed A from bed B through valves 35 and 37 and manifold 13. Meanwhile, evacuation of bed B begins by opening valve 31. Simultaneously, valve 23 is opened and atmospheric air flows through manifold 7 thereby repressurizing bed A. Air entering manifold 7 can be filtered to remove particulate matter (not shown). When the pressures in beds A and B are equalized or nearly equalized, valves 35 and 37 are closed. The duration of this step is typically in the range of 1.0 to 10 seconds. During this step, bed C continues through a make product/feed step.

Figure 3:
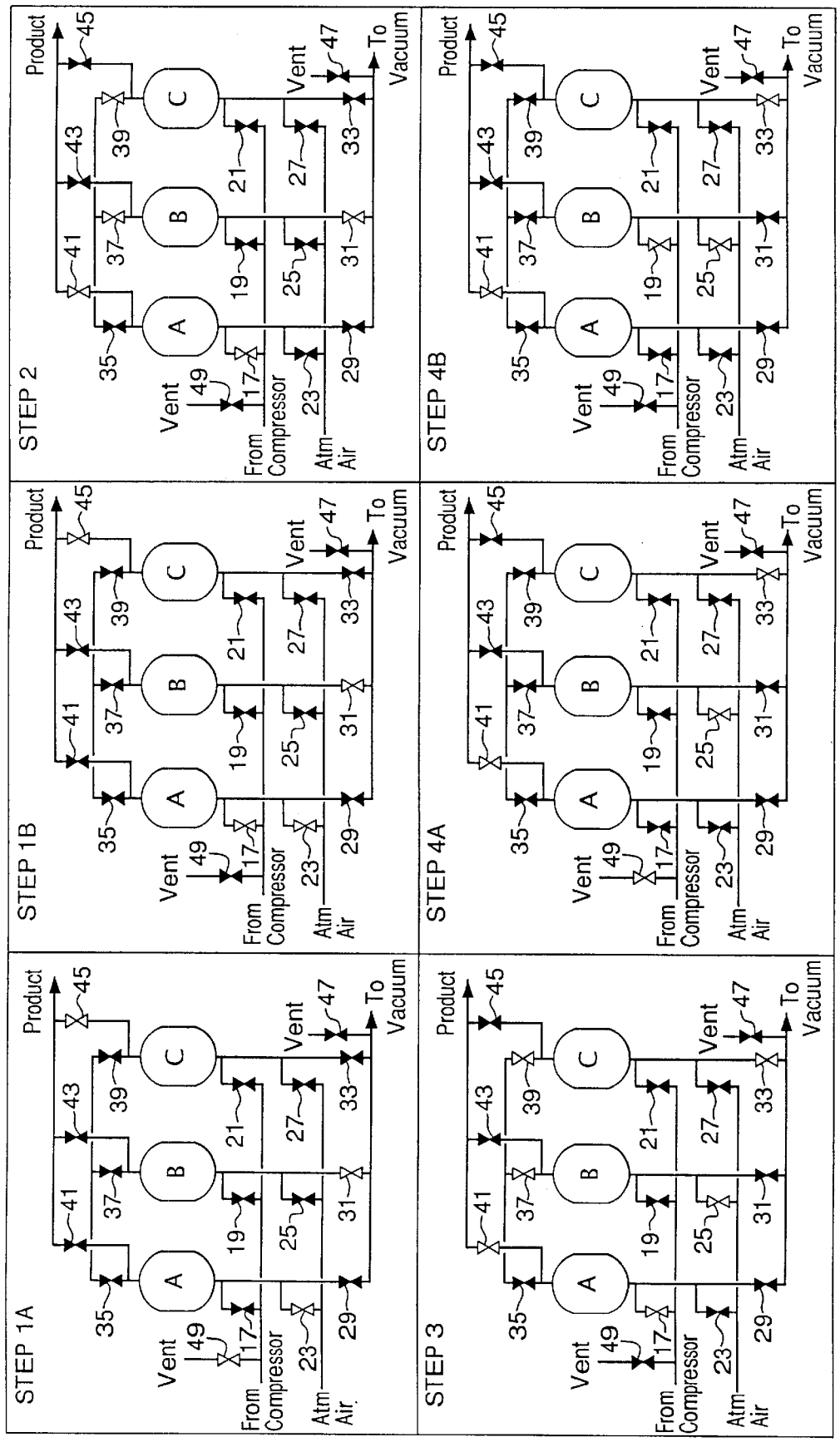
FIGS. 3 and 4 illustrate the valve positions for the three bed PSA system of FIG. 2 operated according to the cycle chart of FIG. 1.
Figure 4:
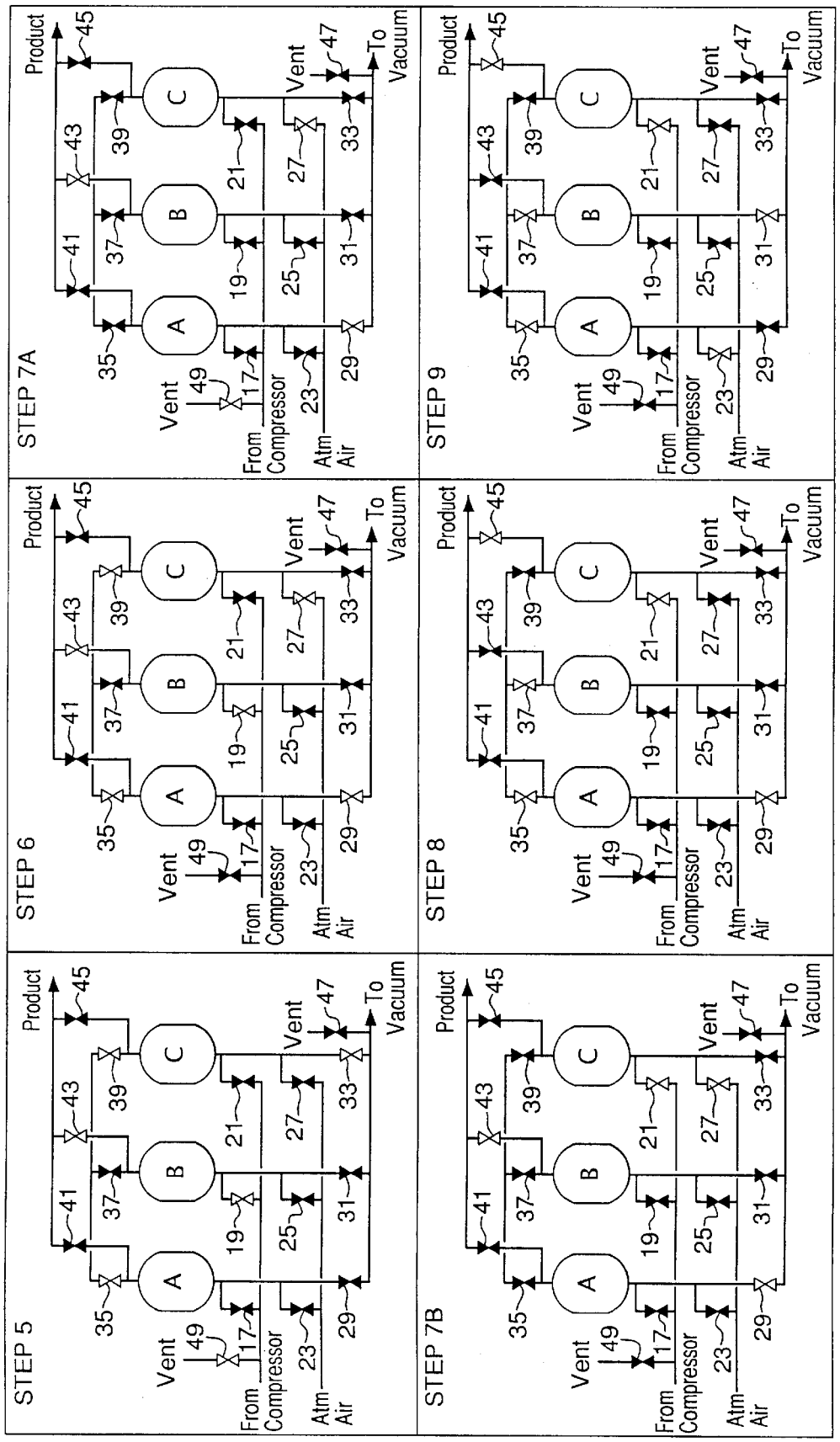

Adsorbent beds B and C proceed in turn through the same series of steps described above, and interact with each other and with bed A according to the cycle time chart of FIG. 1 and the flow diagrams of FIGS. 3 and 4. While the embodiment described above uses three adsorbent beds, more or fewer beds can be used and the cycle adjusted accordingly. If desired, a single bed can be used, but a gas storage tank would be required to hold gas from the provide purge and provide pressure equalization steps for later use in the purge and pressure equalization steps. In addition, a final product gas storage tank would be required to store a portion of the final product gas during the make product and make product/no feed steps for delivery to the end user during the evacuation, purge, and repressurization steps.

In the operation of the oxygen PSA process described above, it is beneficial to set the highest pressure in the range of 1.1 bara to 2.5 bara and the lowest pressure in the range of 0.2 bara and 0.8 bara. One or more feed blowers may be necessary to feed the bed during the higher bed pressure period of the make product/feed step and also during the time in which the feed repressurizaton step is above ambient pressure. One or more vacuum blowers may be used during at least a portion of the countercurrent depressurization and purge steps.

The process cycle of the present invention is especially suitable for operation at higher pressures in the range described above. At a higher peak pressure, more void space gas is available for co-current depressurization, and more co-current depressurization gas is available for making product, for purge, and for counter-current repressurization of an adsorber bed. The higher pressure during the feed/make product step also increases the capacity of the adsorbent, which reduces bed size. The higher product pressure allows for reduction of the product compressor size and compressor power consumption. By operating the process at a higher feed pressure, it is also possible to increase the minimum pressure during the evacuation step, thereby reducing the vacuum requirement of the process. This makes it possible to use fewer vacuum blower stages in the process, or to increase the isothermal efficiency of the vacuum blower. While the feed compression step does consume more power when operating at higher feed pressures, the benefits mentioned above more than compensate for this and allow an overall reduction in specific power.

The process cycle as described above may be operated when the required final product gas flow rate is at or near the design flow rate. When the demand for final product gas decreases, the process cycle described above may be modified to operate in a turndown mode according to either of two embodiments of the present invention. During turndown operation using these embodiments, the flow rate of the pressurized feed gas to the adsorber beds is reduced by venting via valve 49 a portion of the gas supplied from the feed compressor (not shown). An average volumetric flow ratio is defined as the ratio of the volumetric flow rate of the pressurized feed gas to the volumetric flow rate of the final product gas. In the present invention, the average volumetric flow ratio of the pressurized feed gas to the final product gas during normal design operation may be essentially equal to the average volumetric flow ratio of the pressurized feed gas to the final product gas during turndown operation. As used here, essentially equal means that the average value of this ratio varies by no more than about ±5% between normal design and turndown operation. In addition, during this modified cycle in turndown operation, the average oxygen concentration in the final product gas during normal design operation may be essentially equal to the average oxygen concentration in the final product gas during turndown operation. As used here, essentially equal means that the average oxygen concentration in the final product gas varies by no more than about ±1 vol % between turndown and normal design operation.

Figure 6:
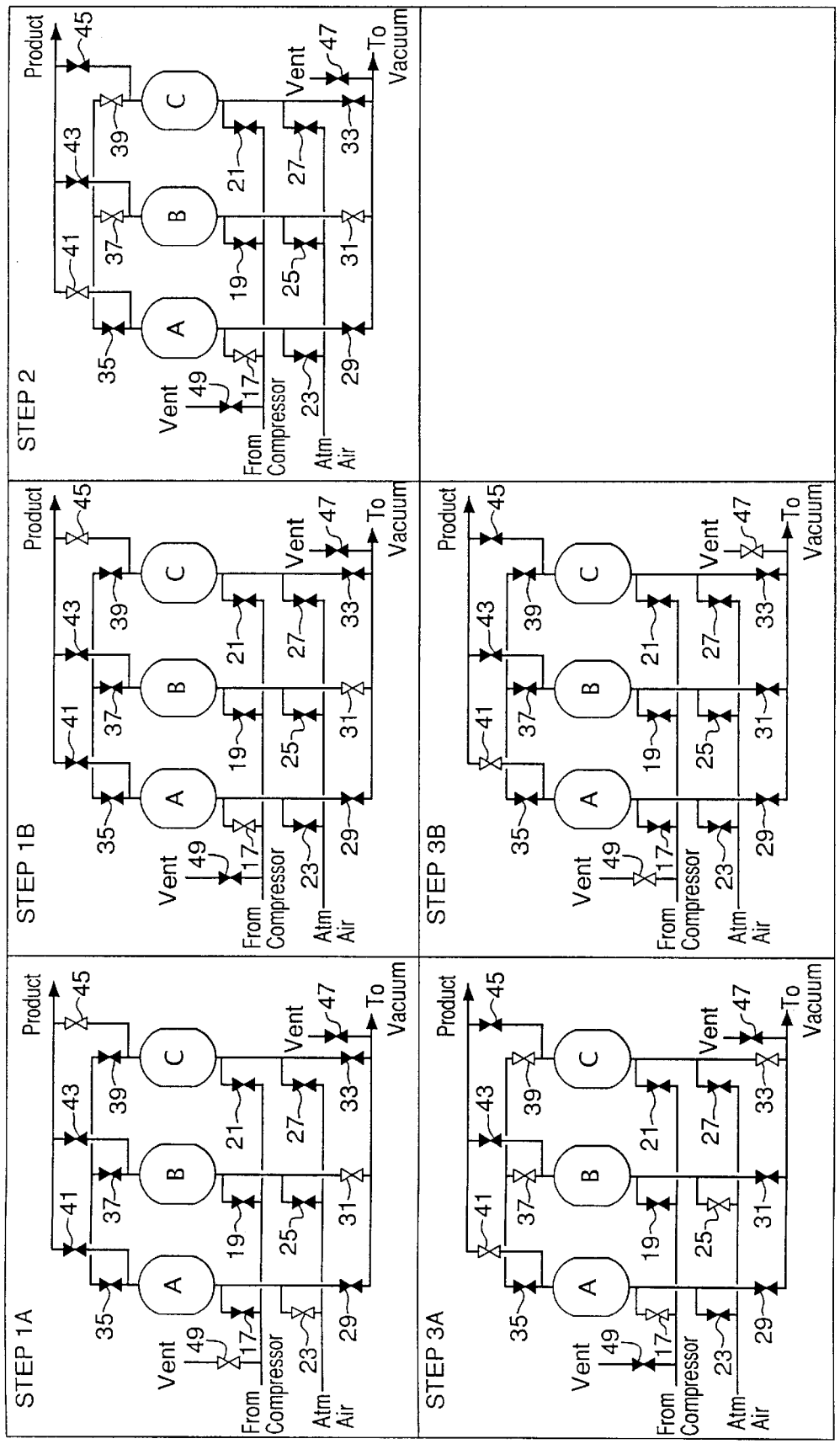
FIGS. 6, 7, and 8 illustrate the valve positions for the three bed PSA system of FIG. 2 operated according to the cycle chart of FIG. 5.
Figure 7:
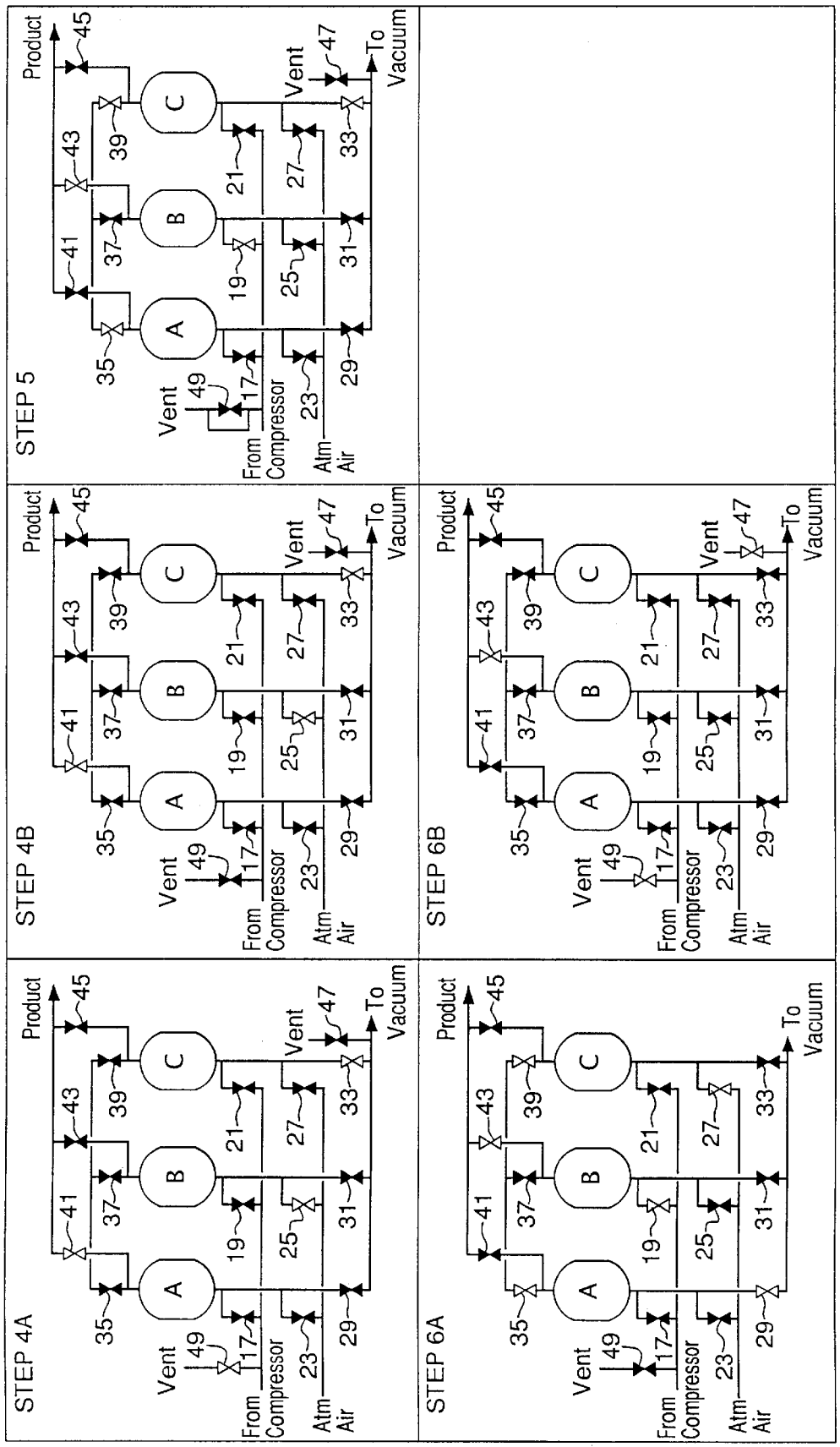
Figure 8:
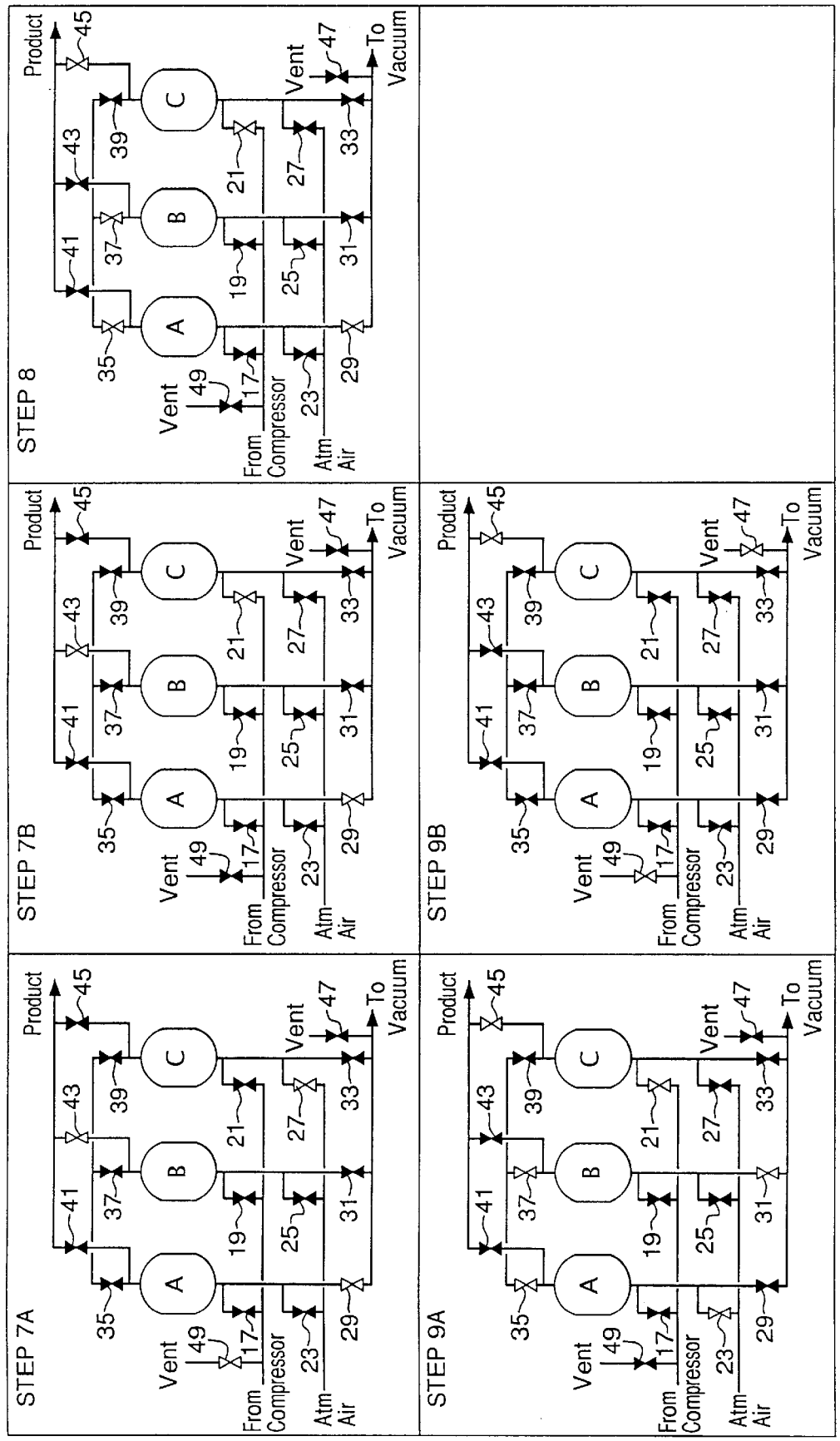

A first of these embodiments is illustrated in the cycle chart of FIG. 5, which is presented in three sections for convenience. The cycle begins at time 0 and proceeds through times a, b, and c. The accompanying valve positions for the steps of FIG. 5 are shown in FIGS. 6 through 8 in which open valves are filled in white and closed valves are filled in black. In this first embodiment, the duration of the make product/no feed step for bed A, designated as 4A and 4B in FIG. 1, is extended while the final product flow rate is decreased to meet a lower demand. In this embodiment, the overall extended make product/no feed step is identified by the individual steps 3B, 4A, and 4B of FIG. 5. During a portion of this extended make product/no feed step, idle steps may be used in the cycle for beds B and C as shown in FIG. 5.

In addition to extending the make product/no feed step, an idle step may be inserted following the provide pressure equalization/evacuation step. For bed A, the provide pressure equalization/evacuation step is designated as step 6A (FIG. 5) and the inserted idle step for bed A is shown as step 6B. During this idle step, the feed and product valves of bed A are closed as shown in FIG. 7, thereby isolating bed A. Also, during this idle step, the compressed feed air from the compressor is vented to the At atmosphere through valve 49 and the vacuum blower inlet is open to the atmosphere through valve 47.

Another idle step may be inserted following the pressure equalization/atmospheric air repressurization step (for bed A, this is step 9A of FIG. 5) and the added idle step is step 9B (FIG. 5). During this idle step, the feed and product valves of bed A are closed as shown in FIG. 7, thereby isolating bed A as above. Also, during this idle step, the compressed feed air from the compressor is vented to the atmosphere through valve 49 and the vacuum blower inlet is open to the atmosphere through valve 47 as above.

Atmospheric repressurization step 1A may follow idle step 9B as illustrated for bed A. During this step, bed A is opened to the atmosphere via valve 23 and the feed compressor is vented through valve 49 as shown in FIG. 6.

Figure 10:
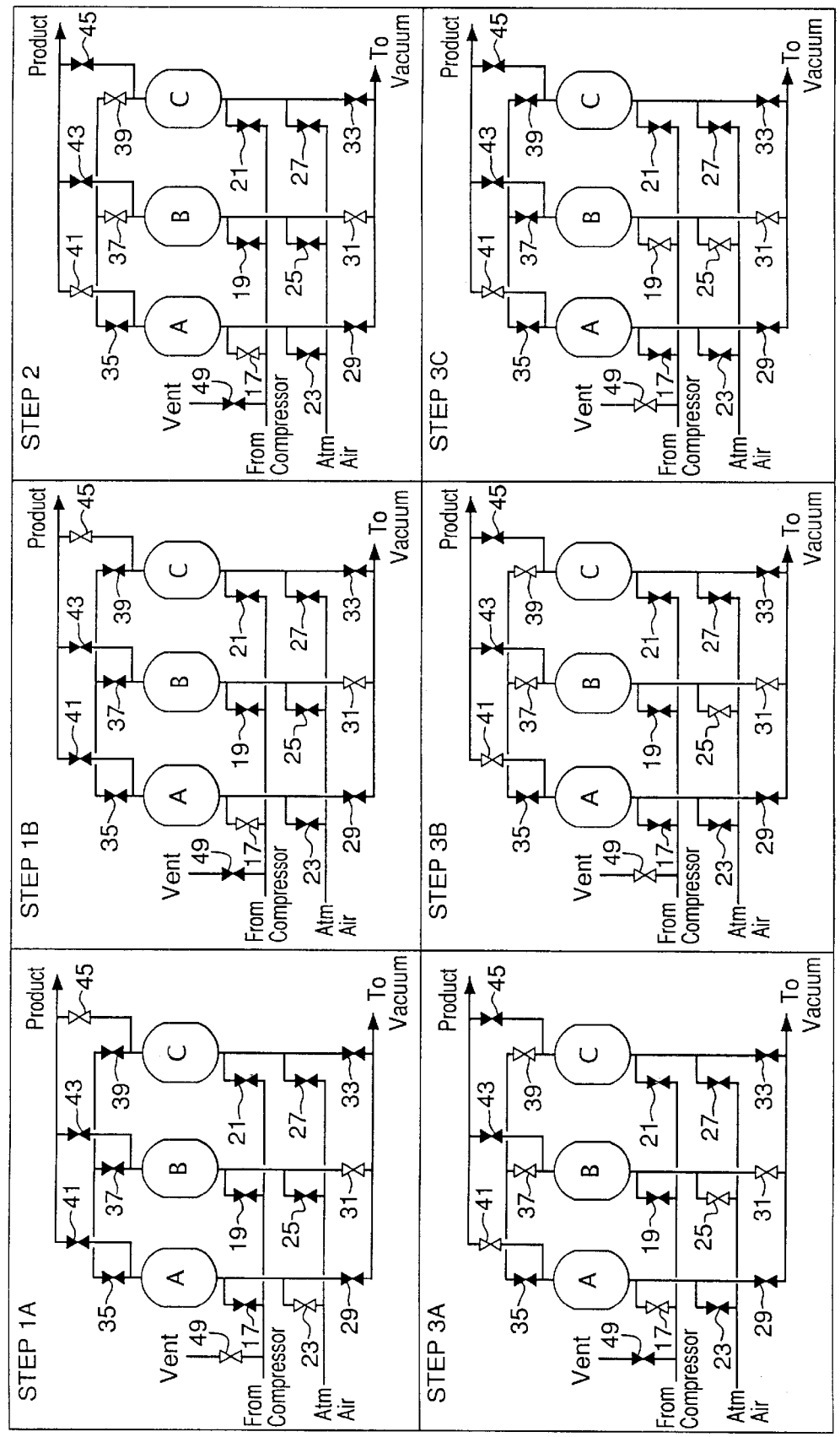
FIGS. 10, 11, and 12 illustrate the valve positions for the three bed PSA system of FIG. 2 operated according to the cycle chart of FIG. 9.
Figure 11:
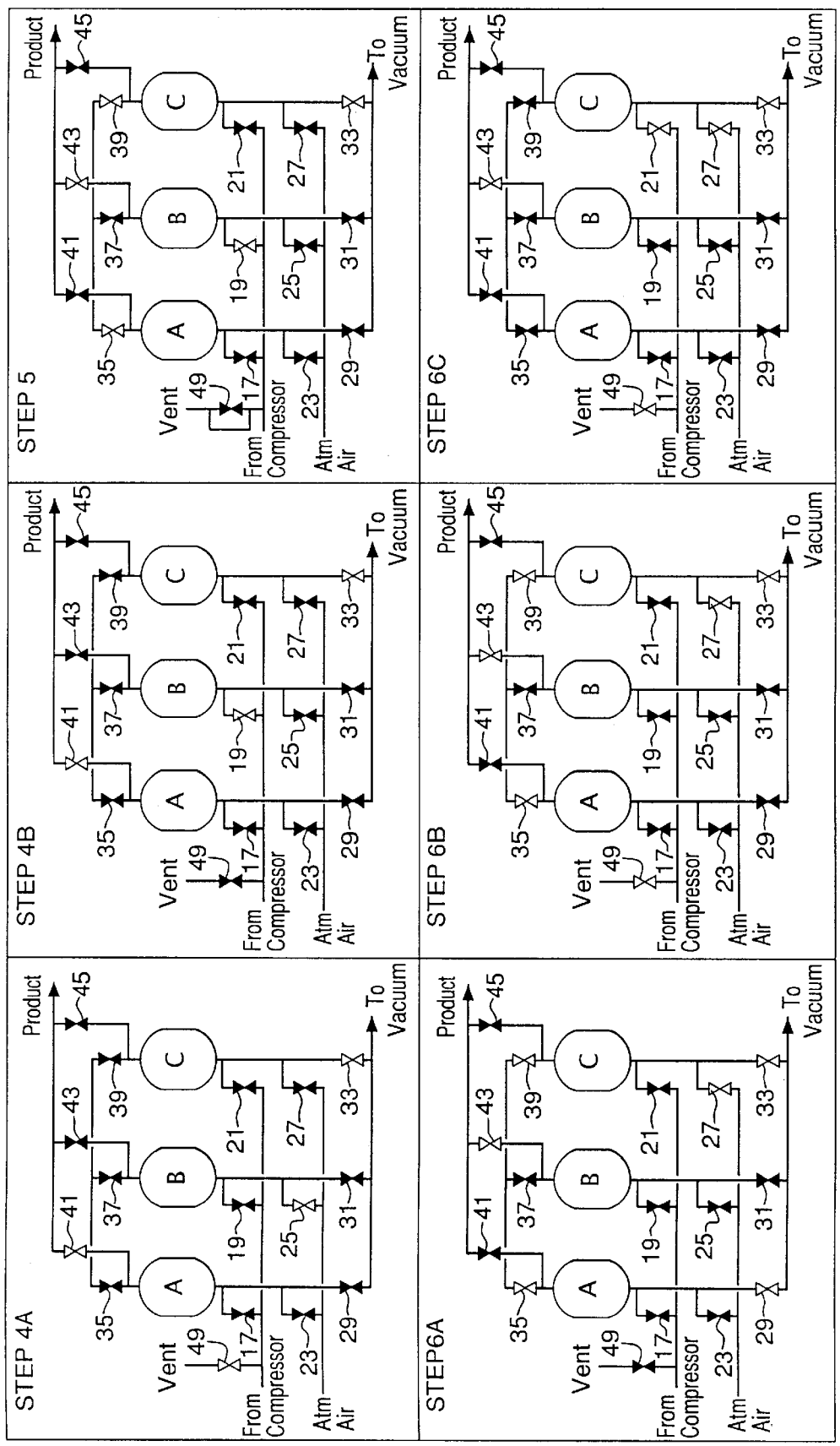
Figure 12:
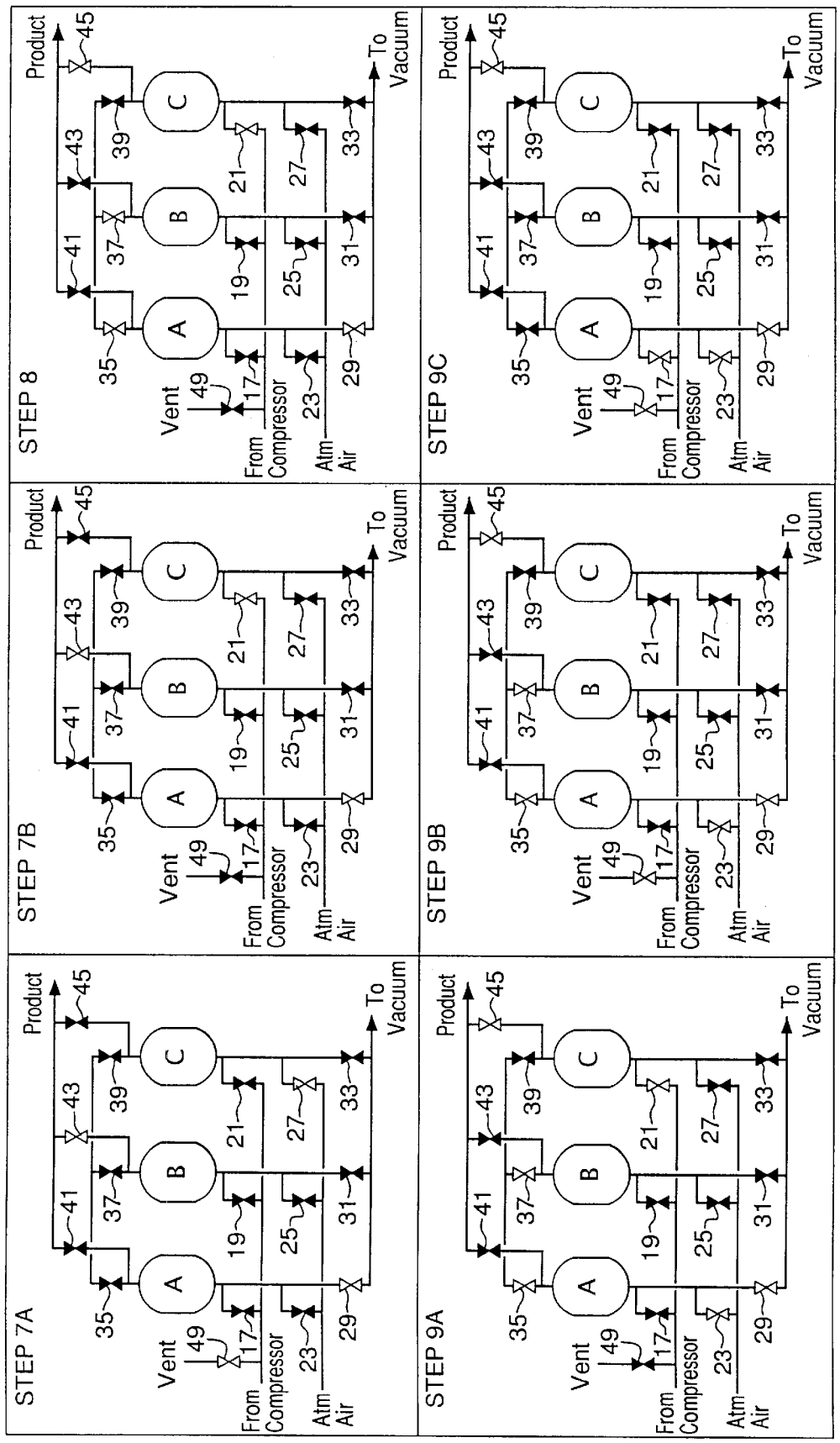

A second embodiment of the invention is illustrated in the cycle chart of FIG. 9, which is presented in three sections for convenience. The cycle begins at time 0 and proceeds through times a, b, and c. The accompanying valve positions for the steps of FIG. 9 are shown in FIGS. 10 through 12 in which open valves are filled in white and closed valves are filled in black. As in the first embodiment described above, the duration of the make product/no feed step is extended while the final product flow rate is decreased to meet a lower demand. As seen in FIG. 9, the overall make product/no feed step for bed A is designated by steps 3B, 3C, 4A, and 4B and the valve positions for these are shown in FIGS. 10 and 11.

In addition to extending the make product/no feed step, an idle step may be inserted following the provide pressure equalization step 6A, 6B (FIG. 9), and this inserted idle step for bed A is shown as step 6C. During this idle step, the feed and product valves of bed A are closed as shown in FIG. 11, thereby isolating bed A. Also, during this idle step, the compressed feed air from the compressor is vented to the atmosphere through valve 49 and the vacuum blower inlet is open to the atmosphere via valve 27, valve 33, manifold 3, and manifold 11. In this embodiment, valve 47 of the previous embodiment is eliminated, thereby simplifying the system and process.

Another idle step may be inserted in this second embodiment which is a modification of the corresponding idle step of the first embodiment. This idle step of the second embodiment may be described as a modified idle step or a feed/ambient air to vacuum blower step, and this step is shown for bed A as step 9C in FIG. 9. During step 9C, as shown in FIG. 12, valves 17, 23, 29, and 49 are all open while bed A is idle.

Although bed A is open to the discharge of the feed compressor, the suction of the vacuum blower, and the atmosphere, there is essentially no gas flow into or from the bed during this step except for a possible slight inflow at the beginning of the step.

This second embodiment does not require a separate vent valve 47 for the vacuum blower inlet as required in the first embodiment above. In the absence of valve 47, slight modifications to the cycle steps may be used during periods in which there is no bed evacuation and the vacuum blower is idling. These are indicated in FIG. 10, steps 3A, 3B, and 3C; FIG. 11, steps 6A, 6B, and 6C; and FIG. 12, steps 9A, 9B, and 9C. In each of these steps, the feed valve of a bed which has just completed the evacuation and purge steps (and therefore is at the minimum pressure in its cycle) remains open as the vacuum pump idles by taking in air from the atmospheric air vent via manifold 3.

The following Examples illustrate the present invention but do not limit the invention to any of the specific details described therein.

EXAMPLE 1

The PSA process cycle of FIG. 1 is operated to recover an oxygen-enriched product from air at an average product purity of 90 vol % oxygen and at a design product flow rate of 100,000 standard cubic feet per hour (100 tons/day) using the PSA system of FIG. 2. The elapsed time and end-of-step bed pressure for each step in bed A are given in Table 2 below. The total cycle time is 48 seconds.

TABLE 2

Cycle Step Times and Pressures in Bed A for Example 1

| Step No. (FIG. 1) | Step Description | Elapsed Time, seconds | End-of-Step Pressure, psia |
|---|---|---|---|
| 2, 3 | Make Product | 6 | 24.2 |
| 4A, 4B | Make Product/ no feed | 10 | 22.0 |
| 5 | Provide Purge | 4 | 17.6 |
| 6 | Provide PE/ Evacuation | 2 | 12.2 |
| 7A, 7B | Evacuation | 10 | 6.0 |
| 8 | Receive Purge | 4 | 7.7 |
| 9 | Pressure Equalization/Atm | 2 | 11.5 |
| 1A | Atmospheric Repressurization | 3 | 13.4 |
| 1B | Atm/Feed Repressurization | 7 | 20.8 |

EXAMPLE 2

The PSA process cycle of FIG. 1 is modified to yield the turndown process cycle of FIG. 5. The PSA system of FIG. 2 is operated using the cycle of FIG. 5 at 50% of the design product flow rate of Example 1. The average product purity at turndown is essentially equal to the product purity of Example 1. The average volumetric flow ratio of the pressurized feed gas to the final product gas during turndown operation is essentially equal to the average volumetric flow ratio of the pressurized feed gas to the final product gas during normal design operation in Example 1. The elapsed time and end-of-step bed pressure for each step in bed A are given in Table 3 below. The total cycle time for turndown operation is 96 seconds.

TABLE 3

Cycle Step Times and Pressures in Bed A for Example 2

| Step No. (FIG. 5) | Step Description | Elapsed Time, seconds | End-of-Step Pressure, psia |
|---|---|---|---|
| 2, 3A | Make Product | 6 | 24.2 |
| 3B, 4A, 4B | Make Product/ no feed | 26 | 22.0 |
| 5 | Provide Purge | 4 | 17.6 |
| 6A | Provide PE/ Evacuation | 2 | 12.2 |
| 6B | Idle | 16 | 12.2 |
| 7A, 7B | Evacuation | 10 | 6.0 |
| 8 | Receive Purge | 4 | 7.7 |
| 9A | Pressure Equalization/Atm | 2 | 11.5 |
| 9B | Idle | 16 | 11.5 |
| 1A | Atmospheric Repressurization | 3 | 13.4 |
| 1B | Feed Repressurization | 7 | 20.8 |

During this turndown operation, the power consumption during idle step 6B and idle step 9B is about 33% of the average power consumption of the plant when running at normal design capacity. The fraction of design power consumed during turndown can be calculated by the following equation.

$$\text{Fraction of design power} = \frac{(\% \text{ of Design Production}) + (0.33 \times (100 - \% \text{ of Design Production}))}{100}$$

In this Example, a PSA system operating in turndown mode at 50% of design capacity will consume 66.5% of the power consumed at design operating capacity.

EXAMPLE 3

The PSA process cycle of FIG. 1 is modified to yield the turndown process cycle of FIG. 9. The PSA system of FIG. 2 is operated using the cycle of FIG. 9 at 50% of the design final product flow rate of Example 1. The average product purity at turndown is essentially equal to the product purity of Example 1. The average volumetric flow ratio of the pressurized feed gas to the final product gas during turndown operation is essentially equal to the average volumetric flow ratio of the pressurized feed gas to the final product gas during normal design operation in Example 1.

The elapsed time and end-of-step bed pressure for each step in bed A are given in Table 4 below. The total cycle time for turndown operation is 96 seconds.

TABLE 4

Cycle Step Times and Pressures in Bed A for Example 3

| Step No. (FIG. 9) | Step Description | Elapsed Time, seconds | End-of-Step Pressure, psia |
|---|---|---|---|
| 2, 3A | Make Product | 6 | 24.2 |
| 3B, 3C, 4A, 4B | Make Product/ no feed | 26 | 22.0 |
| 5 | Provide Purge | 4 | 17.6 |
| 6A, 6B | Provide PE | 4 | 12.8 |
| 6C | Idle | 14 | 12.6 |
| 7A, 7B | Evacuation | 10 | 6.0 |
| 8 | Receive Purge | 4 | 7.7 |

TABLE 4-continued

Cycle Step Times and Pressures in Bed A for Example 3

| Step No. (FIG. 9) | Step Description | Elapsed Time, seconds | End-of-Step Pressure, psia |
|---|---|---|---|
| 9A, 9B | Pressure Eq/Atm/Evac | 4 | 12.5 |
| 9C | Feed/Amb Air to Vac Blower | 14 | 12.6 |
| 1A | Atm Repress | 3 | 14.0 |
| 1B | Feed Repressurization | 7 | 20.8 |

During this turndown operation, the power consumption during idle step 6C and modified idle step (feed/amb air to vac blower) 9C is about 25% of the average power consumption of the plant when operating at the normal design rate. The fraction of design power consumed during turndown can be calculated by the following equation.

$$\text{Fraction of design power} = \frac{(\% \text{ of Design Production}) + (0.25 \times (100 - \% \text{ of Design Production}))}{100}$$

In this Example, a PSA system operating at 50% of design capacity will consume 62.5% of the power consumed at design capacity.

Thus the present invention offers a method for turndown operation of a pressure swing adsorption process in which the make product/no feed step is extended and idle steps are introduced at specific points in the process during the depressurization and repressurization steps. The invention minimizes the impact of turndown by maintaining overall cycle efficiency, and this is accomplished by operating the process during turndown to achieve end-of-step pressures similar to those used during normal design operation.

What is claimed is:

1. A pressure swing adsorption process for the separation of a pressurized feed gas containing at least one more strongly adsorbable component and at least one less strongly adsorbable component which comprises (a) during a period of design product gas flow, the steps of (1) introducing the pressurized feed gas into a feed end of an adsorber bed containing one or more solid adsorbents which preferentially adsorb the more strongly adsorbable component and withdrawing from a product end of the adsorber bed a first adsorber effluent gas enriched in the less strongly adsorbable component, wherein the first adsorber effluent gas is utilized as final product gas;

(2) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is withdrawn therefrom, and wherein the second adsorber effluent gas is utilized as additional final product gas;

(3) depressurizing the adsorber bed to a minimum bed pressure by withdrawing additional gas therefrom;

(4) repressurizing the adsorber bed by introducing repressurization gas into the bed, wherein at least a portion of the repressurization gas is provided by pressurized feed gas; and (5) repeating steps (1) through (4) in a cyclic manner; and (b) during a period of reduced product gas flow, utilizing steps (1) through (5) in modified form wherein the duration of step (2) is extended, a first idle period introduced into step (3), and a second idle period or a modified idle period is introduced into step (4).

2. The method of claim 1 wherein the average volumetric flow ratio of the pressurized feed gas to the final product gas during (a) is essentially equal to the average volumetric flow ratio of the pressurized feed gas to the final product gas during (b).

3. The method of claim 1 wherein the more strongly adsorbed component is nitrogen and the less strongly adsorbed component is oxygen, and wherein the average oxygen concentration in the final product gas during (a) is essentially equal to the average oxygen concentration in the final product gas during (b).

4. The process of claim 1 wherein the adsorber bed is one of a plurality of adsorber beds, each of which undergoes in turn steps (1) through (5) during (a) and steps (1) through (5) in modified form during (b).

5. The process of claim 4 wherein the depressurizing of each adsorber bed in step (3) is accomplished by (3a) withdrawing a first gas stream from the bed until the pressure therein reaches a first intermediate pressure and utilizing at least a portion of the first gas stream to purge another bed;

(3b) withdrawing a second gas stream from the bed until the pressure therein reaches a second intermediate pressure and utilizing at least a portion of the second gas stream to pressurize yet another bed; and (3c) evacuating the bed from the feed end using a vacuum blower until the pressure therein reaches the minimum bed pressure.

6. The process of claim 5 wherein the first idle period follows step (3b).

7. The process of claim 5 which further comprises purging the bed following the evacuation step (3c) by introducing a purge gas into the product end of the bed while continuing to evacuate gas from the feed end of the bed.

8. The process of claim 7 wherein the purge gas is provided to the bed by a first gas stream withdrawn from another bed which is in step (3a).

9. The process of claim 5 which further comprises evacuating the bed from the feed end while withdrawing the second gas stream from the product end of the bed during step (3b).

10. The process of claim 9 wherein the first idle period follows step (3b).

11. The process of claim 5 wherein the repressurizing of the bed in step (4) is accomplished by (4a) introducing repressurizing gas into the adsorber bed wherein a portion of the repressurizing gas is provided by a second gas stream withdrawn from another bed which is in step (3b); and (4b) introducing repressurizing gas into the adsorber bed wherein a portion of the repressurizing gas is provided by pressurized feed gas from a feed gas compressor.

12. The process of claim 11 wherein the second idle period follows step (4a).

13. The process of claim 11 wherein the modified idle period follows step (4a).

14. The process of claim 11 wherein the pressurized feed gas is air, the more strongly adsorbable component is nitrogen, the less strongly adsorbable component is oxygen, and the final product gas is enriched in oxygen.

15. The process of claim 14 wherein a portion of the repressurization gas in step (4a) is provided by allowing atmospheric air to flow into the adsorber bed when the pressure in the bed is initially below atmospheric pressure.

16. The process of claim 14 wherein a portion of the repressurization gas in step (4b) is provided by allowing atmospheric air to flow into the adsorber bed when the pressure in the bed is initially below atmospheric pressure.

17. The process of claim 14 wherein the vacuum blower has an inlet which is in flow communication with atmospheric air during step (4a).

18. The process of claim 17 wherein the feed gas compressor discharges to the atmosphere during step (4a).

19. A pressure swing adsorption process for the separation of a pressurized feed gas containing at least one more strongly adsorbable component and at least one less strongly adsorbable component which comprises (a) during a period of design product gas flow, the steps of
  (1) introducing the pressurized feed gas into a feed end of an adsorber bed containing one or more solid adsorbents which preferentially adsorbs the more strongly adsorbable component and withdrawing from a product end of the adsorber bed a first adsorber effluent gas enriched in the less strongly adsorbable component, wherein the first adsorber effluent gas is utilized as a final product gas, wherein the adsorber bed is one of a plurality of adsorber beds;
  (2) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is withdrawn therefrom, and wherein the second adsorber effluent gas is utilized as a final product gas;
  (3) depressurizing the adsorber bed to a minimum bed pressure by withdrawing additional gas therefrom, wherein the depressurizing of the adsorber bed is accomplished by
    (3a) withdrawing a first gas stream from the bed until the pressure therein reaches a first intermediate pressure and utilizing at least a portion of the first gas stream to purge another bed;
    (3b) withdrawing a second gas stream from the bed until the pressure therein reaches a second intermediate pressure and utilizing at least a portion of the second gas stream to pressurize yet another bed; and
    (3c) evacuating the bed from the feed end until the pressure therein reaches the minimum bed pressure;
  (4) purging the bed following the evacuation of step (3c) by introducing a purge gas into the product end of the bed while continuing to evacuate gas from the feed end of the bed, wherein the purge gas is provided to the bed by a first gas stream withdrawn from another bed in step (3a);
  (5) repressurizing the adsorber bed by introducing a second gas stream withdrawn from another bed which is in step (3b);
  (6) further repressurizing the adsorber bed by introducing pressurized feed gas into the bed; and
  (7) repeating steps (1) through (6) in a cyclic manner; and (b) during a period of reduced product gas flow, utilizing steps (1) through (5) in modified form wherein the duration of step (2) is extended, a first idle period introduced into step (3), and a second idle period or a modified idle period is inserted into step (4).

20. The process of claim 19 wherein the pressurized feed gas is air, the more strongly adsorbable component is nitrogen, the less strongly adsorbable component is oxygen, and the final product gas is enriched in oxygen.

21. The process of claim 20 which further comprises, following step (5) and prior to step (6), allowing atmospheric air to flow into the adsorber bed when the pressure in the bed is initially below atmospheric pressure.

22. The process of claim 19 which further comprises evacuating the bed from the feed end while withdrawing the second gas stream from the product end of the bed during step (3b).

23. The process of claim 19 wherein the average volumetric flow ratio of the pressurized feed gas to the final product gas during (a) is essentially equal to the average volumetric flow ratio of the pressurized feed gas to the final product gas during (b).

24. The method of claim 19 wherein the more strongly adsorbed component is nitrogen and the less strongly adsorbed component is oxygen, and wherein the average oxygen concentration in the final product gas during (a) is essentially equal to the average oxygen concentration in the final product gas during (b).

* * * * *